United States Patent
Tolman et al.

(10) Patent No.: US 9,923,629 B2
(45) Date of Patent: Mar. 20, 2018

(54) SELF-DEPLOYING AND SELF-HEALING SUBSEA DATA NETWORK AND METHOD OF USE

(71) Applicant: Oceaneering International, Inc., Houston, TX (US)

(72) Inventors: Thomas Knight Tolman, Annapolis, MD (US); Gary Wieboldt, Annapolis, MD (US); Louis Hromada, Columbia, MD (US); Thomas Burke, Hanover, MD (US); Dustin Whipple, Severn, MD (US); Mark Alan Stevens, Houston, TX (US)

(73) Assignee: OCEANEERING INTERNATIONAL, INC., Houstonl, TX (US)

( * ) Notice: Subject to any disclaimer, the term of this patent is extended or adjusted under 35 U.S.C. 154(b) by 0 days.

(21) Appl. No.: 14/736,116

(22) Filed: Jun. 10, 2015

(65) Prior Publication Data

US 2016/0006501 A1    Jan. 7, 2016

Related U.S. Application Data

(60) Provisional application No. 62/010,335, filed on Jun. 10, 2014.

(51) Int. Cl.
*H04B 10/29* (2013.01)
*H04B 10/03* (2013.01)

(52) U.S. Cl.
CPC ............. *H04B 10/03* (2013.01); *H04B 10/29* (2013.01)

(58) Field of Classification Search
CPC ...................................................... H04B 10/29
See application file for complete search history.

(56) References Cited

U.S. PATENT DOCUMENTS

| 2003/0026662 | A1* | 2/2003 | Vidal | F16L 1/123 405/157 |
| 2011/0097157 | A1* | 4/2011 | Swiatowy | B23C 3/007 405/184.1 |
| 2011/0177779 | A1* | 7/2011 | Rhodes | H04B 11/00 455/40 |

* cited by examiner

*Primary Examiner* — Shi K Li
(74) *Attorney, Agent, or Firm* — Maze IP Law, PC

(57) ABSTRACT

A self-deploying and self-healing subsea network comprises one or more homing vehicles, one or more data repeaters, and one or more independent guidable homing systems configured to assist the homing vehicles in localization of and docking with the data repeaters. A plurality of data repeaters are deployed in a body of water and, at a predetermined time, a homing vehicle released from a first data repeater and instructed to transit to and dock with a predetermined second data repeater. After docking, a network cable is operatively placed into communication between the first data repeater and the second data repeater.

12 Claims, 1 Drawing Sheet

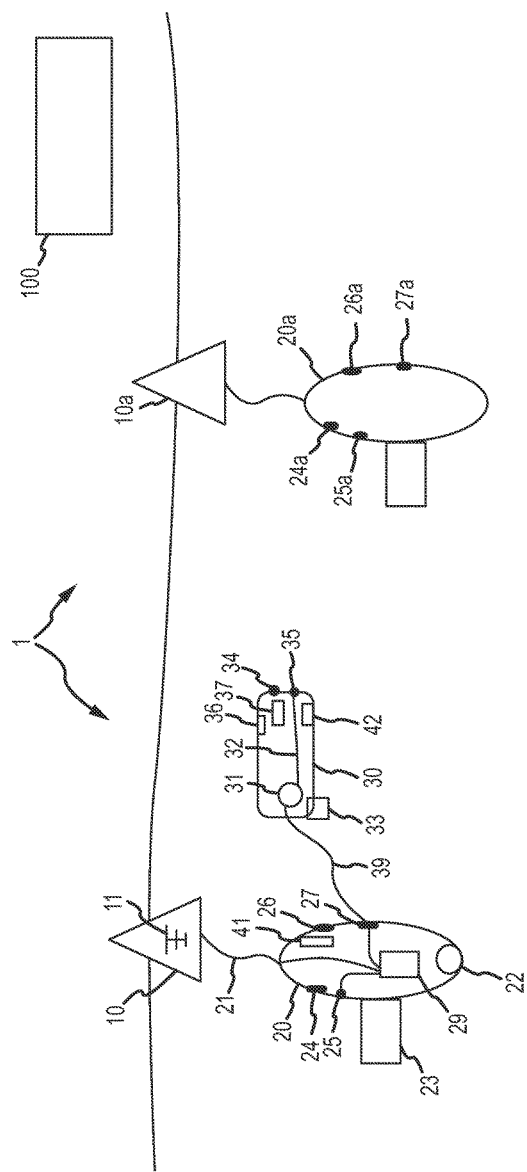

SELF-DEPLOYING AND SELF-HEALING SUBSEA DATA NETWORK AND METHOD OF USE

This application claims the benefit of, and priority through, U.S. Provisional Application 62/010,335, titled "A Self-Deploying And Self-Healing Subsea Fiber Optic Network And Method Of Use," filed Jun. 10, 2014.

FIELD OF THE INVENTION

The invention relates generally deployment and use of a temporary wide area subsea fiber optic network in deep water from a surface ship in (potentially) high sea state.

BACKGROUND OF THE INVENTION

Small (~1 mm diameter) fiber optic cable must connect large repeater nodes that are positioned deep, and at great distances from one another. The interconnecting fiber optic cable and nodes are purposely positioned deep in a region that has little or no biologic activity (e.g. fishbite) that would be harmful to the small cable. The system must hover at that depth while the network is in operation. A major risk to the system is damage to the fiber optic cable during deployment. Hazards may include loads induced at connection points to nodes, loads induced while deploying from the surface craft and then through the air-sea interface, and/or damage during decent from the surface to the final operating depth, e.g. from fishbite and other physical hazards.

Although fiber optic cables are one concern, the described invention is not limited to fiber optic cable.

FIGURES

The figures supplied herein disclose various embodiments of the claimed inventions.

FIG. 1 is block diagrammatic view of an exemplary embodiment of a self-deploying and self-healing subsea network.

DESCRIPTION OF VARIOUS EMBODIMENTS

Referring to FIG. 1, self-deploying and self-healing subsea network 1 comprises one or more homing vehicles 30, one or more data repeaters 20,20a, and one or more homing systems 41,42 configured to assist homing vehicles 30 in localization of and docking with data repeaters 20,20a. As used herein, data repeater 20a is identical in configuration to data repeater 20.

Typically, each homing vehicle 30 comprises homing vehicle transceiver 36, docking connectors 34,35, logic 37 operatively in communication with homing vehicle transceiver 36, data cable 39, and controllable propulsion system 33.

Homing vehicle docking connectors 34,35 can comprise mechanical docking connector 34, optical docking connector 35, or the like, or a combination thereof Homing vehicle transceiver 36 is typically configured to receive a data signal, e.g. an acoustic data signal, from data repeater 20 and provide that data signal to logic 37 which can then, as described below, use data present in the data signal to determine ranging, homing and docking information related to network repeater 20.

Logic 37, which comprises a central processing unit or the like, is typically configured to perform numerous functions, by way of example and not limitation comprising decoding instructions present in a signal received by homing vehicle transceiver 36; determining an initial position of homing vehicle 30; instructing homing vehicle 30 to transit from a first position, e.g. its current position, to a second position; and monitoring the progress of the transition of homing vehicle 30 to second position. Additionally, logic 37 may receive an updated signal data from transceiver 36 and use the updated signal data received from the transceiver 36 for course correction during the transit. Logic 37 may be configured to determine an initial position of data repeater 20 and/or homing vehicle 30 with respect to any other data repeater, e.g. 20a.

Typically, each data repeater 20 comprises data repeater transceiver 22 which comprises a data signal transmitter operatively in communication with data repeater transceiver 36 and configured to transmit a signal to homing vehicle 30; one or more sets of homing vehicle receiving connectors 24,26 configured to allow docking of homing vehicles 30 with data repeater 20, e.g. via complimentary homing vehicle docking connectors 34,35; one or more sets of connection points 25,27 configured to operatively connect to data cable 39; and one or more sets of data cable interfaces 29 configured to be operatively in communication with data cable 39 and at least one set of connection points 25,27.

Homing vehicle receiving connectors 24,26 may comprise a plurality of homing vehicle receiving connectors 24,26 and, further, may comprise mechanical docking connector 24, optical docking connector 26, or the like, or a combination thereof, where, as noted above, these homing vehicle receiving connectors 24,26 are complimentary to homing vehicle docking connectors 34,35.

In embodiments where such is the case, the set of connection points 25,27 comprises a plurality of connection points 25,27 corresponding to the plurality of homing vehicle receiving connectors 24,26.

Data cable 39 may comprise a fiber optic cable or wire cable or the like or a combination thereof. Additionally, homing vehicle 30 may further comprise spool 31 configured to allow data cable 39 to pay out behind homing vehicle 30.

Homing system 41,42 may comprise an acoustic homing system and, if so, the data signal received by homing vehicle transceiver 36 comprises an acoustic signal. Further, data repeater transceiver 22 may comprise an acoustic signal data signal transmitter.

In certain embodiments, homing system 41,42 further comprises intelligent diagnostic management system 100 operatively in communication with the set of data repeaters 20. Intelligent diagnostic management system 100 may be used as part of a system that monitors the health of various data communication links and be configured to automatically deploy homing vehicle 30 to repair a detected bad link.

In embodiments, a data signal from data signal transceiver 22 comprises data representing a distance from data repeater 20 to homing vehicle 30 such as in real time.

Cable interface 29 is typically operatively in communication with network cable 39 and with each set of connection points 25,27.

In the operation of exemplary embodiments, a self-healing network may be deployed by deploying a plurality of data repeaters 20, as described above, in a body of water, by way of example and not limitation from a surface ship, a submarine, or an aircraft, by way of example and not limitation including a helicopter.

Typically, each data repeater 20 is such to a predetermined depth such as to the sea floor.

At a predetermined time, e.g. upon detection of a data or other equipment failure or via an occurrence of a remote command transmitted through data communications link 11, homing vehicle 30 be docked at or deployed proximate to first data repeater 20 is released and instructed to transit to a predetermined second data repeater, e.g. data repeater 20a, where homing vehicle 30 is a described above.

In embodiments, transceiver 36 is configured to receive an acoustic data signal from network repeater 20a. In certain embodiments, intelligent diagnostic management system 100 supplies a data signal comprising an instruction instructing homing vehicle 30 to transit from first data repeater 20 to second data repeater 20a. Intelligent diagnostic management system 100 and/or one or more data repeaters 20 and/or homing vehicles 30 may further be used to monitor health of various data communications links automatically deploy homing vehicle 30 to repair a bad data communication link.

Logic 37 is typically used to decode one or more instructions present in the received data signal and, upon detecting a transit instruction in the decoded instruction, determine an initial position of homing vehicle 30 and/or first data repeater 20 with respect to second data repeater 20a and instruct homing vehicle 30 to transit to second data repeater 20a.

Additionally, logic 27 may monitor the current position of homing vehicle 30 during transit from first data repeater 20 to second data repeater 20a in real time. In certain embodiments, logic 37 also decodes an updated signal data received by transceiver 36 in real time during transit and issue one or more commands to correct the transit of homing vehicle 30 to second data repeater 30a using the updated signal data, which may comprise ping information.

During transit, released homing vehicle 30 typically pays out network cable 39, which is operatively connected to first data repeater 20, from the released homing vehicle 30.

When homing vehicle 30 approaches second data repeater 20a, homing system 41,42 is used to assist homing vehicle 30 in localization of and docking with second data repeater 20a. When homing vehicle 30 is correctly positioned with respect to second data repeater 20a it docks to second data repeater 20a, such as via the complimentary docking connectors 24,26,34, and 25. After docking, network cable 39 is operatively placed into communication between first data repeater 20 and second data repeater 20a.

If network cable 39 fails, a further data repeater 20 may be dropped and positioned and the homing vehicle hookup procedure repeated to maintain data communications In embodiments, multiple homing vehicles 30 may be configured to implement a star network topology.

The foregoing disclosure and description of the invention is illustrative and explanatory. Various changes in the size, shape, and materials, as well as in the details of the illustrative construction and/or an illustrative method may be made without departing from the spirit of the invention.

What is claimed is:

1. A self-deploying and self-healing subsea network, comprising:
   a. a set of homing vehicles, each homing vehicle of the set of homing vehicles comprising:
      i. a homing vehicle transceiver configured to receive a signal from a data repeater;
      ii. a set of homing vehicle docking connectors;
      iii. logic operatively in communication with the homing vehicle transceiver, the logic configured to:
         1. decode an instruction present in the signal received by the homing vehicle transceiver;
         2. determine an initial position of the homing vehicle;
         3. instruct the homing vehicle to transit from its current position to a second position; and
         4. monitor the progress of the transition of the homing vehicle to the second position;
         5. receive updated signal data received from transceiver; and
         6. use the updated signal data received from the transceiver for course correction during the transit; and
      iv. a data cable;
   b. a set of data repeaters, each data repeater comprising:
      i. a data repeater transceiver
      ii. a data signal transmitter operatively in communication with the data repeater transceiver and configured to transmit a signal to a homing vehicle using the data repeater transceiver;
      iii. a set of homing vehicle receiving connectors configured to be complimentary to the homing vehicle docking connectors and allow docking of a homing vehicle of the set of homing vehicles with the repeater;
      iv. a connection point configured to operatively connect to the data cable; and
      v. a data cable interface operatively in communication with the data cable and the connection point; and;
   c. a homing system configured to assist a homing vehicle of the set of homing vehicles in localization of and docking with a data repeater of the set of data repeaters.

2. The self-deploying and self-healing subsea network of claim 1, wherein the data cable comprises a fiber optic cable.

3. The self-deploying and self-healing subsea network of claim 1, wherein:
   a. the homing system comprises an acoustic homing system; and
   b. the signal received from the network repeater comprises an acoustic signal.

4. The self-deploying and self-healing subsea network of claim 3, wherein a data signal received by the homing vehicle transceiver comprises an acoustic signal.

5. The self-deploying and self-healing subsea network of claim 1, wherein the logic determines the initial position of the repeater with respect to a data repeater.

6. The self-deploying and self-healing subsea network of claim 1, wherein a homing vehicle of the set of homing vehicles further comprises a spool configured to allow the cable to pay out behind the homing vehicle.

7. The self-deploying and self-healing subsea network of claim 1, wherein the data repeater transceiver comprises an acoustic signal data signal transmitter.

8. The self-deploying and self-healing subsea network of claim 1, wherein a data signal from the data signal transceiver comprises data representing a distance from the data repeater to the homing vehicle in real time.

9. The self-deploying and self-healing subsea network of claim 1, wherein:
   a. the homing vehicle receiving connectors comprise a plurality of homing vehicle receiving connectors; and
   b. the connection point comprises a plurality of connection points corresponding to the plurality of homing vehicle receiving connectors.

10. The self-deploying and self-healing subsea network of claim 1, wherein the data repeater comprises an antenna.

11. The self-deploying and self-healing subsea network of claim 1, wherein the cable interface is operatively in communication with the network cable and each of the plurality of connection points.

12. The self-deploying and self-healing subsea network of claim 1, wherein the homing system further comprises an intelligent diagnostic management system operatively in communication with the set of data repeaters.

\* \* \* \* \*